(12) United States Patent
Chertov et al.

(10) Patent No.: US 12,476,879 B2
(45) Date of Patent: Nov. 18, 2025

(54) METHOD AND SYSTEM FOR USE OF CUSTOM DATA MODELS IN NETWORK DEVICE MANAGEMENT

(71) Applicant: Arista Networks, Inc., Santa Clara, CA (US)

(72) Inventors: Roman Olegovich Chertov, San Jose, CA (US); Sebastian Sapa, Vancouver, CA (US); Christopher Elisha Neilson, Vancouver (CA); Ronan Mac Fhlannchadha, Dublin (IE)

(73) Assignee: Arista Networks, Inc., Santa Clara, CA (US)

( * ) Notice: Subject to any disclaimer, the term of this patent is extended or adjusted under 35 U.S.C. 154(b) by 1 day.

(21) Appl. No.: 18/490,607

(22) Filed: Oct. 19, 2023

(65) Prior Publication Data
US 2024/0297829 A1    Sep. 5, 2024

Related U.S. Application Data

(60) Provisional application No. 63/487,994, filed on Mar. 2, 2023.

(51) Int. Cl.
*H04L 41/08* (2022.01)
*H04L 41/14* (2022.01)

(52) U.S. Cl.
CPC ........ *H04L 41/145* (2013.01); *H04L 41/0886* (2013.01)

(58) Field of Classification Search
CPC ............ H04L 41/145; H04L 41/0886; H04L 41/0816
See application file for complete search history.

(56) References Cited

U.S. PATENT DOCUMENTS

| | | | | |
|---|---|---|---|---|
| 6,389,464 | B1* | 5/2002 | Krishnamurthy ... | H04L 41/0253 709/221 |
| 10,326,657 | B1* | 6/2019 | A ......................... | H04L 41/0859 |
| 10,558,542 | B1* | 2/2020 | A ............................ | H04L 41/22 |
| 2010/0162205 | A1* | 6/2010 | Clemm ............... | H04L 41/0213 717/106 |
| 2018/0013662 | A1* | 1/2018 | Salam ................. | H04L 41/0226 |
| 2018/0176096 | A1* | 6/2018 | Prabakaran .......... | H04L 41/122 |
| 2019/0020544 | A1* | 1/2019 | Kristjánsson ....... | H04L 41/0853 |
| 2019/0132213 | A1* | 5/2019 | Na ....................... | H04L 41/0226 |

(Continued)

FOREIGN PATENT DOCUMENTS

EP            4020923           6/2022

OTHER PUBLICATIONS

European Search Report issued by the European Patent Office (EPO) for European Patent Application No. 24160534.4, mailed Jul. 8, 2014, 10 pages.

(Continued)

*Primary Examiner* — Chris Parry
*Assistant Examiner* — Hassan Abdur-Rahman Khan
(74) *Attorney, Agent, or Firm* — Sprinkle IP Law Group

(57) ABSTRACT

Embodiments as disclosed allow the definition and use of custom models in association with a network agent on a network device. In particular, custom models can be placed on a network device and utilized by the network device. The use of these custom models including, notifications and responses associated with those custom models, may appear indistinguishable to use of vendor supplied models.

13 Claims, 3 Drawing Sheets

(56) References Cited

U.S. PATENT DOCUMENTS

2020/0328948 A1* 10/2020 Nayyar ............... H04L 41/0803
2022/0197876 A1*  6/2022 Sterne .................. H04L 41/145
2022/0329489 A1* 10/2022 Nayyar ................ H04L 41/145

OTHER PUBLICATIONS

Sgambelluri et al., "Open Source Implementation of OpenConfig Telemetry-Enabled NETCONF Agent," IEEE, © 2019, 4 pages.

* cited by examiner

METHOD AND SYSTEM FOR USE OF CUSTOM DATA MODELS IN NETWORK DEVICE MANAGEMENT

RELATED APPLICATIONS

This patent application claims the benefit of priority under 35 U.S.C. 119 to U.S. Provisional Patent Application Ser. No. 63/487,994, filed Mar. 2, 2023, entitled "Method and System For Use of Custom Data Models In Network Device Management" by inventors Chertov et al, which is incorporated herein in its entirety by reference for all purposes.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Figure 1A:
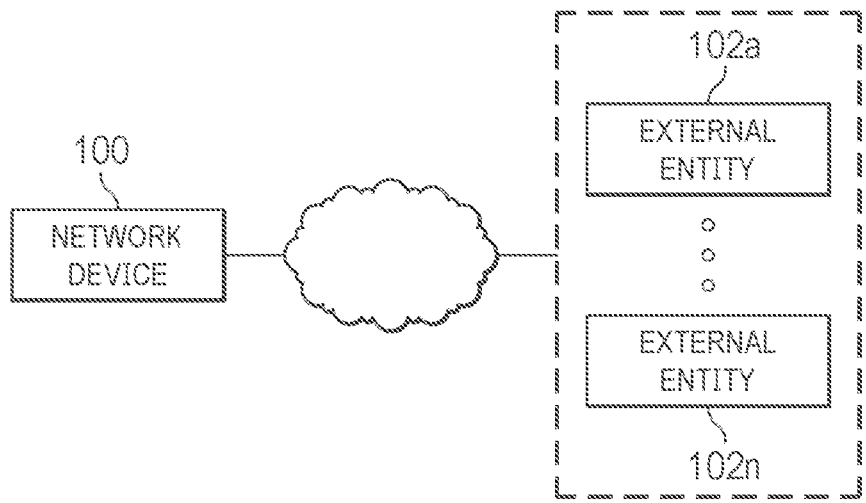
FIG. 1A is a block diagram of a network system including an embodiment of a network device for using custom models for network device management.

Models are often employed in the implementation and management of network devices (e.g., hardware or software utilized in a network, collectively referred to as network devices or elements interchangeably). These models are structured representations of those network devices and their associated configured or operational state or administrative actions, and are usually described in a data modeling language such as YANG (Yet Another Next Generation). This modeling allows for the consistent and structured representation of devices or protocol attributes. Such model definitions typically include the (e.g., low level) data types used to represent configurational states or operational attributes, as well as constraints that should be enforced during configuration. By using these types of modeled representations a consistent mechanism for device configuration, as well as the validation of the device state through streaming telemetry or other device interrogation methods, can be provided. These modeled device representations can also be transformed into data structures that can be used by network devices or network management systems to dynamically control device configuration or state.

Accordingly, models may be used both by providers (e.g., manufacturers or vendors) of network devices and users of those network devices that desire to configure those network devices or monitor network devices in operation (e.g., users that utilize such network devices in their network, administrators of such networks, etc.). Specifically, providers of these network devices may utilize data models internally to implement internal operations of the network devices, such as configuration or management (e.g., monitoring, administration, etc.) of their devices or other operations. Similarly, external (e.g., to a network device) data models may be employed by users of those network devices (e.g., entities that employ network devices to provide a network) or other third parties to accomplish network management.

As discussed, models are employed in the implementation and management of network devices, where those models are defined in a data modeling language to represent those network devices and their associated configured or operational state or administrative actions. In this way, the devices and their attributes may be represented in a consistent and structured manner. These models can thus provide a convenient medium for dynamic device configuration, as well as the validation of the device state through streaming telemetry or other device interrogation methods.

These models are thus used both by providers of network devices and their users to configure or monitor network devices. Providers of these network devices may utilize the data models to implement internal operations of the network devices while external (e.g., to a network device) data models allow users to manage those network devices. The native models employed by device manufacturers may, however, not be identical, or even similar, to the external models employed by users to manage those network devices. This situation may result in increased complexity with respect to such network management.

To reduce this complexity, a recent trend has been to employ vendor neutral data models (e.g., models that have been standardized, such as by a committee, standard settings body, or the like) to configure and manage networks. These vendor neutral data models define the configuration and operational state of network devices for common network structures, protocols, or services. The use of vendor neutral data models may assist users of network devices (or others tasked with network management) in moving toward a dynamic, programmable method for configuring and managing networks, including those where network devices from multiple vendors may be employed, by allowing network devices to be configured and managed according to a single data model. One example of such a vendor neutral data model is the OpenConfig data model promulgated by the OpenConfig working group.

An ecosystem of open source and third-party proprietary applications or tooling (e.g., network management software) has thus been developed to utilize such external data models (including vendor neutral data models) to configure and manage network devices. Consequently, vendors of network devices provide support for the use of such external data models by providing software, services or other interfaces or functionality (referred to herein collectively as an agent) adapted for such external data models.

In particular, these agents may operate according to a network management protocol through which configuration, operational state, telemetry, or other data (collectively network element data) can be obtained or provided using these external data models. Examples of such network management protocols include the gRPC (Remote Procedure Call) Network Management Interface (gNMI) protocol. gNMI is an open-source protocol used to transfer (e.g., stream) data to and from network devices. For example, gNMI carries data modeled according to OpenConfig, which has some encoding. Accordingly, network element data structured according to the OpenConfig data model may be streamed using the gNMI protocol. Other protocols that may be utilized include, for example RESTCONF or NETCONF. As such, these agents may accept requests (e.g., commands) and return responses according to a network management protocol (e.g., gNMI) where network element data included in those requests may be specified according to an external data model (e.g., a vendor neutral data model such as OpenConfig).

In many cases, however, vendors of network devices may still employ native data models for use with their network devices and associated operating systems. This is because while vendor neutral data models provide a wide range of feature coverage, there is commonly still a need to model hardware, software, features, configuration, operation, behavior, or other network element data, specific to a vendor's device.

Thus, an agent (e.g., an OpenConfig agent which will be used herein as a non-limiting example) on a network device may utilize both these vendor neutral models and native data models to provide data or otherwise allow management of the configuration of the network device. In particular, an agent (e.g., an OpenConfig agent) may, upon initialization, read in a number of vendor provided modules (defined in a modeling language such as YANG) that define the OpenConfig model or the vendor specific model. A YANG module may define a data model and determine the encoding for that data. A YANG module defines a data model through its data, and the hierarchical organization of, and constraints on, that data. A module can be a complete, standalone entity, or it can reference definitions in other modules and submodules as well as augment other data models with additional nodes.

Thus, the (e.g., OpenConfig) agent can define an in-memory structures that represent the schema (e.g., paths, etc.) defined by those YANG modules. The data for these in-memory (e.g., volatile) structures may, for example, be populated by data from a database (e.g., a system database) maintained at the network device that stores data associated with the operation of the network device.

Accordingly, an (e.g., OpenConfig) agent may be used by users to perform management of the network device (e.g., by performing gNMI GET, SET, CAPABILITIES or SUBSCRIBE methods). As an OpenConfig agent may create schemas based on the OpenConfig defined YANG models or vendor defined YANG models (referred to collectively as the vendor supplied or predefined models), these users may use a mix of standardized YANG models defined by the OpenConfig working group, and any additional YANG modules defined by the vendor of the network device, to manage the network device. This means a user may only be able to set data (e.g., in YANG) which is already predefined by the OpenConfig working group or the vendor.

It is, however, desirable to allow users to define their own modules (e.g., modules different than the vendor supplied modules, referred to herein as "custom" modules) and have the network elements (e.g., schemas, paths, nodes, data, etc.) specified by those modules loaded into a network agent. Embodiments as disclosed may therefore provide such a capability in network devices whereby a user can provide such custom modules and those custom modules will be loaded into a network agent (e.g., an OpenConfig agent) appropriately. In particular, embodiments as disclosed may provide support for loading custom modules (e.g., one non-limiting example is a custom YANG modules that will be used herein without loss of generality) into a network agent responsible for providing information according to a model (e.g., an OpenConfig agent). A user may be able to load as many YANG modules as they like, and the network element data for the network elements (e.g., paths, nodes, etc.) defined by these YANG models settable through the OpenConfig agent (e.g., using a gNMI SET). Moreover, the network element data for the network elements defined by these custom YANG models may also be retrievable through the OpenConfig agent (e.g., using a gNMI GET). In some embodiments, modifying the custom model may result in notifications being sent to clients to a path or schema defined by that custom YANG model.

Embodiments as disclosed therefore allow a user to define custom YANG modules in association with a network agent on a network device. In particular, a user can write custom YANG models (e.g., not models supplied by a vendor on the network device) and place them on the network device. Previously, users could only use the vendor supplied models which were provided to them (e.g., in the version of the operating system) on the network device. Embodiments thus allow users to add custom models at any time they like. To any client who streams events or other network element data off the network device, notifications and responses associated with that custom model may appear indistinguishable to notifications or responses associated with the vendor supplied models.

These custom YANG models may be adapted, named, or stored such that they are associated with a particular namespace. In some embodiments, this namespace may be, for example, be named "Custom", or include the name "custom", but almost any name for the namespace may be utilized (e.g., as long as that name is reserved for the namespace for custom YANG models). For example, for a YANG module named "foo", that module may include the following line: namespace "custom-foo".

These custom models may also be placed in a particular location that is defined on the network device. For example, custom YANG modules (e.g., defining custom YANG models) may be stored at a particular directory path associated with custom YANG modules (e.g., /persist/sys/OpenConfig/yang/modules). Such a directory may be created by a user when utilizing custom YANG models if such a directory does not exist. Vendor supplied YANG modules may be stored in a separate directory. By using separate directories the OpenConfig agent may enforce a requirement that expected vendor supplied YANG modules do indeed exist, while simultaneously providing the flexibility of user supplied custom YANG modules.

In one embodiment, the custom YANG modules desired to be used can be configured by the user by setting an environment variable to specify the desired YANG modules. For example, the environment variable may be OPENCONFIG_CUSTOM_MODULES and it may be set to the names of the modules that it is desired for the OpenConfig agent to import and use. The following command is one example of setting such an environmental variable on a network device where foo and bar are YANG modules stored at the directory for custom YANG modules such as /persist/sys/OpenConfig/yang/modules.

switch(config)    #agent    OpenConfig    environment OPENCONFIG_CUSTOM_MODULES=foo,bar The network (e.g., OpenConfig) agent can then be informed of the names of these custom YANG modules. Specifically, the OpenConfig agent can read in both the vendor supplied YANG models and the custom YANG models stored in the directory reserved for custom YANG models (e.g., /persist/sys/OpenConfig/yang/modules) and configured in the environmental variable (e.g., OPENCONFIG_CUSTOM_MODULES). In one embodiment, the OpenConfig agent may use the goyang package to aid in the loading of YANG modules. The directories where YANG modules can be loaded from may be set to certain specified directories. When the OpenConfig agent loads modules it may recursively search these specified, configured or default directories for YANG modules. Goyang may search for these YANG modules by concatenating the module name and '.yang'.

Accordingly, in one embodiment, when the OpenConfig agent is restarted it may read in both the vendor supplied YANG modules and the custom YANG models specified in the environmental variable and creates an in-memory representation of the schema (e.g., the paths) from both the vendor supplied YANG models and the custom YANG models. For example, at startup the OpenConfig agent will try to read foo.yang and bar.yang from the /persist/sys/OpenConfig/yang/module. It will then try to import module foo and module bar from these YANG files. In other words, the OpenConfig agent may try to load the files foo.yang and bar.yang, recursively searching for them in all the YANG roots.

In one embodiment, when the OpenConfig agent obtains the custom YANG modules and the vendor supplied modules, the OpenConfig agent may create in-memory data structures for maintaining data corresponding to the network elements (e.g., nodes, paths, schema, etc.) defined by the custom YANG modules and the vendor supplied modules. The data structures corresponding to the custom YANG modules will thus be associated with the custom namespace specified in the custom YANG module (e.g., associated with the term "custom" or other term specifying this custom namespace). The data for these in-memory (e.g., volatile) structures corresponding to vendor supplied models may, for example, be populated by data from a database (e.g., a system database (sysdb), system state store or another process for storing or accessing data, used here interchangeably) maintained at the network device that stores data associated with the operation of the network device.

The data for the in-memory (e.g., volatile) structures corresponding to the custom YANG modules may, for example, be populated by clients external to the device through the OpenConfig agent (e.g., using the gNMI SET method). Embodiments may also allow the definition of custom agents on the network device itself. These custom agents may interact with the OpenConfig agent (e.g., via gNMI) to perform gNMI methods (e.g., such as GET or SET), such that these custom agents may perform gets for certain network element data related to nodes, paths or schemas (e.g., defined by the vendor supplied YANG modules or the custom YANG modules) and may set network element data associated with nodes, paths or schemas of the in-memory data structures maintained by the OpenConfig agent, including network data associated with paths or a schema defined by the custom YANG module (e.g., configured on the network device by the same user or entity that configured that custom YANG module). In this manner, the custom agent can obtain almost any data desired in relation to the network device from the OpenConfig agent (e.g., using a gNMI GET) and can set the data associated with the custom schema through the OpenConfig agent (e.g., using gNMI SET). For example, the custom agent may obtain some data from the OpenConfig agent (e.g., from one or more multiple paths associated with the vendor supplied YANG models) and create a derived value from this obtained data. The custom agent can then store this derived value at a path defined by a custom YANG model through the OpenConfig agent (e.g., using a gNMI SET referencing the path defined by the custom YANG model).

Moreover, external clients may likewise configure the custom agent on the network device by performing gNMI SETs on a certain portion of the custom defined network elements (e.g., nodes, paths, or schema) defined by the custom YANG modules, where those portions of the custom defined YANG model maintained in memory by the OpenConfig agent are used by the custom agent for configuration.

External clients can also subscribe to the custom elements (e.g., nodes, paths or portions of the schema defined by the custom YANG modules) through the OpenConfig agent. The data associated with these custom paths or schema (e.g., and in some cases set by a custom agent on the network device) can thus get streamed to the subscribing external client by the OpenConfig agent on the network device (e.g., using gNMI). Accordingly, by allowing custom YANG modules on the network device along with custom agents that may determine and set data associated with the network elements defined by these custom YANG modules, embodiments may provide an end to end mechanism where custom network element data may be determined by user defined custom agents on the network device, and this custom network element data associated with a custom path and streamed off the network device according to OpenConfig and gNMI using the OpenConfig agent on the network device.

In most cases, when network elements (e.g., nodes, paths, etc.) defined based on vendor supplied YANG models are modified through the OpenConfig agent (e.g., using a gNMI SET), the OpenConfig agent may communicate (either directly through a command line interface or through an intermediary server or agent) with a configuration or other type of agent on the network device to modify corresponding network element data for those network elements as maintained in the non-volatile system database at the network device. These changes are, at some point, then reflected back to (e.g., picked up) by the in-memory version of those same network elements (e.g., nodes, paths, etc.) at the OpenConfig agent.

However, for custom network elements (e.g., nodes, paths, portions of schemas, etc.) that are derived from custom YANG models where the OpenConfig agent has created in-memory data structures corresponding to those custom network elements this may be highly undesirable behavior, as these custom network elements may not exist in the non-volatile system database. Thus, when a set is performed on a custom network element (e.g., when a gNMI SET for a node, path or portion of the schema defined in a custom YANG model is received at the OpenConfig agent), the OpenConfig agent may determine that the network element specified by the set request (e.g., the node, path or portion of the schema referenced by the gNMI SET) is associated with the namespace for a custom YANG module (e.g., the "custom" namespace). When it is determined that the network element whose data is being set by the received gNMI command is in that custom namespace, the OpenConfig agent may only modify the in-memory version of the custom network element being referenced by the received gNMI SET and maintained by the OpenConfig agent without making any calls to the configuration agent or the system database (e.g., to attempt to modify non-volatile data associated with that custom network element), as such a network element does not exist in the system database.

Looking now at FIG. 1A, a computing system including one embodiment of a network device adapted for allowing the definition of custom YANG models is depicted. The system includes a network device 100 connected to one or more external entities (e.g., 102A, 102N). The network device 100 and the external entities 102 may be directly or indirectly connected to each other using any combination of wired or wireless connections and may communicate using one or more wireless or wired protocols. In embodiments there may be other network devices (or systems) (not shown) that facilitate communication between the devices.

Network device 100 may include persistent storage, memory (e.g., Random Access Memory), one or more processors (including a switch chip), and network interfaces (ports). Each port may or may not be connected to another device on a network (e.g., a server, a switch, a router, etc.). The switch chip includes hardware for determining how to route packets at the network device 100 (e.g., to which egress port a packet should be routed). The network device 100 may thus be adapted to receive packets via its ports and process the packet to determine whether to drop or route the packet, and to which port the packet should be routed.

How the network device 100 makes the determination of whether to drop the packet, or send the packet to another device on the network may depend, in part, on whether the network element is a layer-2 (L2) switch or a layer-3 (L3) switch (also referred to as a multi-layer switch), which may perform at least some functions of a router. If the network device 100 is operating as a L2 switch, the network element may use a destination Media Access Control (MAC) address along with a forwarding table to determine out of which port to send the packet. If the network device 100 is operating as a L3 switch, the network device 100 may use the destination Internet Protocol (IP) address of a packet along with a routing table to determine out of which port to send the packet, and includes the ability to write the MAC address of the next device to receive the packet in place of its own MAC address (which the last device to send the packet wrote) in the L2 information encapsulating the packet. If the network device 100 is a multi-layer switch, the multi-layer switch includes functionality to process packets using both MAC addresses and IP addresses.

External entity 102 may be, or may execute on, any type of computing system that is configured to interact with the network device 100. For example, the external device 102 may be a desktop computer operated by a network administrator or other type of user. Users at these external network devices 102 may desire to access network element data related to network device 100 or to configure or otherwise manage network device 100 (for ease of description herein the term access network element data, configure and manage will all be utilized interchangeably when used with reference to a network device). To access element data of network device 100 then, a user at the external entity 102 (e.g., an application used by such a user) may send requests to the network device 100. These requests may be specified according to an external data model, such as a vendor neutral data model like the OpenConfig data model discussed previously. This external data model may serve as a definition for how network element data is to be structured, formatted or presented.

As such, the network device 100 may accept requests and return responses according to a network management protocol (e.g., gNMI) where network element data included in those requests may be specified according to an external data model (e.g., a vendor neutral data model such as OpenConfig). Thus, users controlling these external entities 102 may get, set or otherwise interact with network element data according to vendor supplied models which were provided in the operating system on the network device 100.

According to embodiments, network device 100 may additionally allow users to define custom YANG modules (or modules defined in another modeling language) in association with the network device 100. In particular, a user can write custom YANG models (e.g., a custom YANG model is a model that is not supplied by the vendor on the network device 100) and place them on the network device 100. Accordingly, external entities 102 may stream or otherwise obtain events or other network element data off the network device according to such a model and set data associated with such a custom model, where notifications, responses or other interactions associated with that custom model may appear indistinguishable from interactions associated with the vendor supplied models.

Figure 1B:
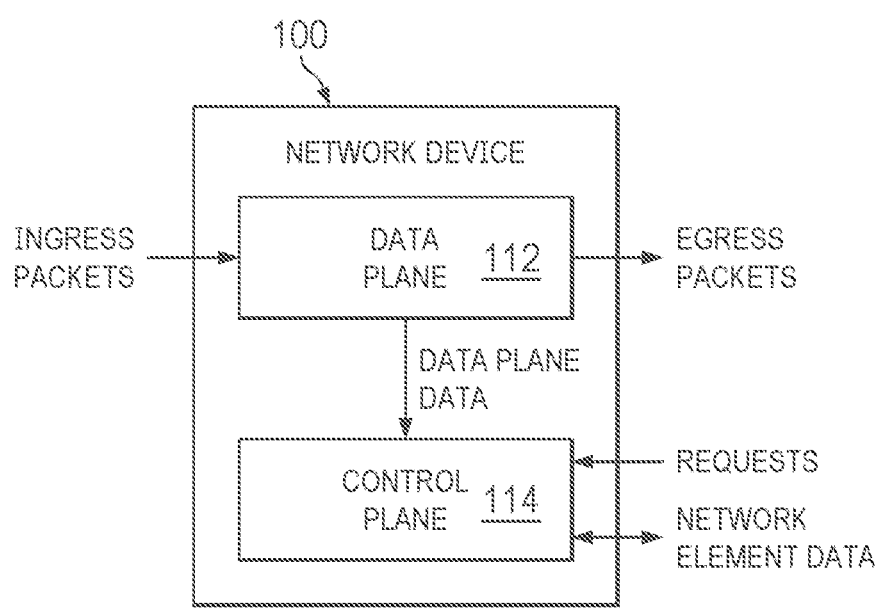
FIG. 1B is a block diagram of an embodiment of a network device for using custom models for network device management.

Moving to FIG. 1B, an embodiment of a network device adapted for allowing the definition of custom YANG models is depicted in more detail. Network device 100 includes a data plane 112 and a control plane 114. The data plane 112 is adapted to receive packets (ingress packets) via ports (not shown) of the network device 100, process the packets and, as appropriate, route packets (egress packets) via the ports. The data plane 112 is also adapted to gather data plane information and to provide this data plane information to the control plane 114. Data plane information includes, for example, network usage data, flow information based on the sampling of packets received by the data plane, information related to queue depths on ingress or egress buffers (not shown) in the data plane, other data traffic statistics or other types of data plane information.

Control plane 114 is adapted to manage the operation of network device 100 (e.g., at least partially based on the data plane information received from data plane 112). More specifically, the control plane 114 is adapted to manage the operation of the data plane 112. The control plane 114 may also be adapted to receive and respond to network element data requests pertaining to the network device 100. In addition, the control plane 114 may also include functionality to push or receive changes to network element data (e.g., configuration or state) to and from one or more target entities (e.g., external devices, virtual machines or applications executing on external devices, etc.).

According to one embodiment, control plane 114 may include one or more network agents to receive these network element data access requests, as well as provide network element data through responses or to perform updates to network element data or network device configurations. An embodiment of such an agent may operate according to a network management protocol (e.g., such as gNMI) through which configuration, operational state, telemetry, or other network element data can be obtained or provided using data models. As such, this agent may accept requests (e.g., commands) and return responses according to a network management protocol (e.g., gNMI) where network element data included in those requests may be specified according to a vendor supplied model (e.g., a vendor neutral data model such as OpenConfig or a proprietary vendor supplied model provided on the network device 100). Additionally, according to embodiments such a network agent on control plane 114 may also allow the definition of a custom model, such that this network agent may accept requests (e.g., commands) and return responses according to such a custom model.

Figure 1C:
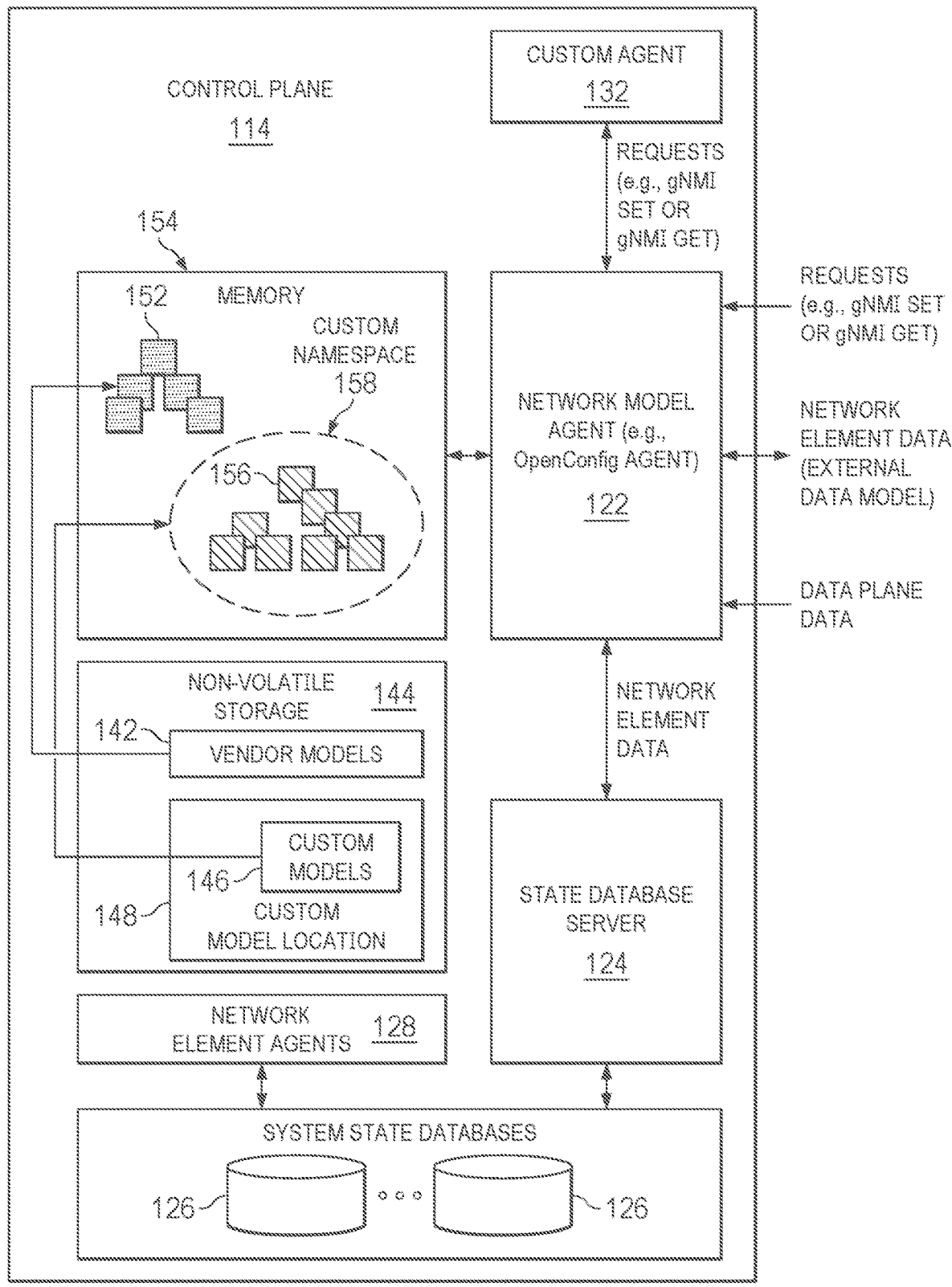
FIG. 1C is a block diagram of a control plane of embodiments of a network device for using custom models for network device management.

Additional details about such a control plane are described with respect to the embodiment of a control plane of a network device depicted in FIG. 1C. Here, control plane 114 may include a network model agent 122 (referred to herein without loss of generality as OpenConfig agent), one or more system state databases 126 and a state database server 124. The control plane 114 may also include one or more network element agents 128 or other functionality to implement protocols, processes, or services of the network device, such as a command line interface agent, a routing information base agent, a forwarding information base agent, a simple network management protocol (SNMP) agent, etc.

System state databases 126 include any single or combination of shared or non-shared data stores (e.g., memories) at one or more locations in network device 100 that store the current state of the network device (e.g., values in data structures used, accessed, stored by, etc. any of the agents or functionality of the control plane 114) such that the system state databases 126 include network element data including the values of variables or parameters that are currently specified or configured for the network device (e.g., such as routing table entries or the like). The system state databases 126 store the aforementioned network element data in records or another data structure within the system state databases 126 where these data structures may conform to vendor supplied data models 142 used by network device 100.

These data structures storing network element data of the network device according to vendor supplied data model 142 may thus include, for example, all, some, or none, of a name of a variable (or parameter used here internally), the current value of the variable, or a timestamp indicating when the record was created (or last modified) and may be stored at a path associated with the parameter, and may store such network element data in accordance with particular nodes or paths of a data model. Other or different network element data about the (e.g., current) state of a network element may be stored in system state databases 126 and such data is fully contemplated herein.

A state database server 124 (which may be implemented as an agent) is adapted to access system state databases 126 in order to obtain, provide or modify relevant network element data (e.g., based on a received request or a subscription for such network element data). The state database server 124 may provide such data according to a particular data format or protocol. For example, state database server 124 may provide network element data according to a particular protocol such as the gNMI protocol (e.g., may provide such network element data as a gNMI stream). Thus, state database server 124 may provide network element data according to a vendor supplied data model 142 (e.g., as it is stored in system state databases 126) and according to a particular protocol (e.g., gNMI).

OpenConfig agent 122 manages sending responses including network element data between the OpenConfig agent 122 and one or more external entities. Specifically, OpenConfig agent 122 may be adapted to send and receive network element data through a number of supported transport protocols. Examples of transport protocols which the OpenConfig agent 122 may use to communicate with external entities, include but are not limited to: HTTP, HTTPS, HTTP2, SPDY, QUIC, Thrift Mux, gRPC, RESTCONF, NETCONF, SOAP, and XMPP. Additionally, the OpenConfig agent 122 may include functionality to serialize (e.g., translate data structures or objects into a stream of bytes) and deserialize (e.g., extract data structures or objects from a stream of bytes) network element data that is to be sent or has been received, respectively. Examples of serialization formats, that may be supported by the OpenConfig agent 130, include but are not limited to: JSON, XML, ASN.1, Protocol Buffer, Thrift, BSON, BDSN, YAML, "gob" (based on the Go programming language), and Cap'n Proto.

As such, OpenConfig agent 122 may accept requests (e.g., management requests, commands, etc.) and return responses according to a network management protocol (e.g., gNMI) where network element data included in those requests may be specified according to a vendor supplied model 142. It will be noted here, then, that a response may be understood in this context to mean any communication for sending network element data to an external entity. Such a communication may be sent, for example, in direct response to a request for such network element data, based on an earlier indication (e.g., subscription) that the external entity is interested in such network element data, or based on some other reason for providing the network element data to the external entity.

The OpenConfig agent 122 may therefore be adapted to obtain network element data such as the state of a network element, updates to the state of the network element, traffic statistics or other data from a data plane, etc. and provide this obtained network element data to one or more external entities according to the corresponding supported vendor supplied data model 142. The OpenConfig agent 122 may, for example, be adapted to send network element data to one or more external entities anytime there is a change in the state of the network element (e.g., anytime there is a change of any value in a specified element in a system state database 126). Such network element data may be obtained from system state databases 126 through state database server 124. The OpenConfig agent 122 may also be adapted to receive network element data from external entities and to write state data, or provide change notifications, to a system state database 126.

To illustrate in more detail, OpenConfig agent 122 may utilize vendor supplied models 142 (comprising for example, vendor neutral models and native or proprietary vendor supplied data models to provide data or otherwise allow management of the configuration of the network device). In particular, the OpenConfig agent may, upon initialization, read in a number of vendor supplied modules 142 stored in non-volatile storage 144, where those vendor supplied models 142 may be in a modeling language such as YANG and where those vendor supplied models define the OpenConfig model or any vendor specific or proprietary model.

Thus, the OpenConfig agent 122 can define structures 152 in (e.g., volatile) memory 154 that represent the network elements of the schema (e.g., nodes, paths, etc.) defined by those vendor supplied YANG modules 142. The data for these in-memory structures 152 may, for example, be populated by network element data from the system database 126 maintained at the network device that stores data associated with the operation of the network device.

Accordingly, as discussed, OpenConfig agent 122 may be utilized by users to perform management of the network device (e.g., by performing gNMI GET, SET, CAPABILITIES or SUBSCRIBE methods). As the OpenConfig agent 122 may create schemas based on the vendor supplied models 142, these users may use a mix of standardized YANG models defined by the OpenConfig working group, and models defined by any additional YANG modules defined by the vendor of the network device to manage the network device. The use means a user may set data (e.g., in YANG) which is already predefined by the OpenConfig working group or the vendor.

It is, however, desirable to allow users to define their own custom data models, and have the schemas (e.g. nodes, paths, etc.) and associated data specified by those modules loaded into OpenConfig agent 122 such that the network device can be managed according to those custom models through the OpenConfig agent 122. Embodiments as disclosed may therefore provide such a capability in network devices whereby a user can provide such custom modules and they will be loaded into a network agent (e.g., an OpenConfig agent) appropriately.

In particular, embodiments as disclosed may provide support for loading custom models 146 into OpenConfig agent 122. A user may be able to load as many custom YANG models 146 as they like, and the data defined by these custom YANG models 146 is settable through the OpenConfig agent 122 (e.g., using a gNMI SET). Moreover, the data defined by these custom YANG models 146 may also be retrievable through the OpenConfig agent 122 (e.g., using a gNMI GET).

Embodiments as disclosed therefore allow a user to define custom YANG models 146 (e.g., defined in a custom YANG module) in association with OpenConfig agent 122. In particular, a user can write custom YANG models 146 (e.g., models not supplied by a vendor on the network device) and store these custom YANG models on the network device in non-volatile storage 144. These custom YANG models 146 may be adapted, named, or stored such that they are associated with a particular namespace. In some embodiments, this namespace may be, for example, be named "Custom", or include the name "custom", but almost any name for the namespace may be utilized (e.g., as long as that name is reserved for the namespace for custom YANG models). For example, for a model defined by a YANG module named "foo", that module may include the following line: namespace "custom-foo".

These custom models 146 may also be placed in a particular location 148 that is defined on the network device for those custom models 146. For example, custom YANG models 146 may be stored at a particular directory path associated with custom YANG modules (e.g., /persist/sys/OpenConfig/yang/modules). Such a directory may be created by a user when utilizing custom YANG models if such a directory does not exist. Vendor supplied YANG models 142 may be stored in a separate location (e.g., directory). By using separate directories the OpenConfig agent 122 may enforce a requirement that expected vendor supplied YANG modules defining vendor supplied YANG models 142 do indeed exist, while simultaneously providing the flexibility of user supplied YANG modules defining custom YANG models 146.

In one embodiment, the custom YANG models 146 desired to use can be configured by the user by setting an environment variable to specify the desired YANG models 146. For example, the environment variable may be OPENCONFIG_CUSTOM_MODULES and it may be set to the names of the YANG modules for models 146 that is desired for the OpenConfig agent 122 to import and use. The following command is one example of setting such an environmental variable on a network device where foo and bar are YANG modules stored at the directory for custom YANG modules such as /persist/sys/OpenConfig/yang/modules.

switch(config)   #agent   OpenConfig   environment OPENCONFIG_CUSTOM_MODULES=foo,bar The OpenConfig agent 122 can then be informed of the names of these custom YANG modules. Specifically, the OpenConfig agent 122 can read in the both the vendor supplied YANG models 142 and the custom YANG models 146 stored in the location (e.g., directory) 148 in non-volatile storage 144 reserved for custom YANG models 146 (e.g., /persist/sys/OpenConfig/yang/modules) and configured in the environmental variable (e.g., OPENCONFIG_CUSTOM_MODULES). In one embodiment, the OpenConfig agent 122 may use the goyang package to aid in the loading of YANG modules for models 142, 146. The directories (or other locations) where YANG modules for models 142, 146 can be loaded from may be set to certain specified directories. When the OpenConfig agent 122 loads modules the agent may recursively search these specified, configured or default directories for YANG modules. Goyang may search for these YANG modules, for example, by concatenating the module name and '.yang'.

Accordingly, in one embodiment, when the OpenConfig agent 122 is restarted it may read in both the vendor supplied YANG modules for vendor models 142 and the custom YANG modules for custom models 146 specified in the environmental variable, and creates an in-memory representation 152 of the schema (e.g., the nodes or paths for network elements) of the vendor supplied YANG models 142 and an in-memory representation 156 of the schema (e.g., the nodes or paths for network elements) of the custom YANG models 146. To continue with the above example, at startup the OpenConfig agent 122 may try to read foo.yang and bar.yang from the/persist/sys/OpenConfig/yang/module. It will then try to import module foo and module bar from these YANG files.

Accordingly, the OpenConfig agent 122 reads in the custom YANG modules for custom models 146 and the vendor supplied modules for vendor models 142. Based on these modules, the OpenConfig agent 122 creates in-memory data structures 152, 156 for maintaining data corresponding to the network elements of the schemas defined by the custom YANG models 146 and the vendor supplied models 142. The data structures 156 corresponding to the custom YANG models 146 will thus be associated with the custom namespace 158 specified in the YANG modules for the custom YANG models 146 (e.g., associated with the term "custom" or other term specifying this custom namespace). The network element data for these in-memory (e.g., volatile) structures 152 corresponding to vendor supplied models 142 may, for example, be populated by data from the system database 126 maintained at the network device that stores data associated with the operation of the network device. The network element data for the in-memory structures 156 corresponding to the custom YANG models 146 may, for example, be populated by clients external to the device through the OpenConfig agent 122 (e.g., using the gNMI SET method).

Embodiments may also allow the definition of custom agents 132 on the network device itself. Such custom agents 132 may, for example, be configured on the network device by the same user or entity that configured the custom YANG modules for the custom YANG models 146. These custom agents 132 may interact with the OpenConfig agent 122 (e.g., via gNMI) to perform gNMI methods (e.g., such as GET or SET), such that these custom agents 132 may perform gets for certain network element data related to nodes or paths of the schema (e.g., defined by the vendor supplied YANG modules or the custom YANG modules) and may set data associated with nodes or paths of the schema of the in-memory data structures 152, 156 maintained by the OpenConfig agent 122, including network element data associated with nodes or paths of a schema defined by in custom YANG model 146.

In this manner, the custom agent 132 can obtain almost any network element data desired in relation to the network device through the OpenConfig agent 122 (e.g., using a gNMI GET) and can set the network element data associated with the custom schema defined in the custom model 146 through the OpenConfig agent 122 using gNMI SET. For example, the custom agent 132 may obtain some network element data from the OpenConfig agent 122 (e.g., from one or more of multiple nodes or paths associated with the vendor supplied YANG models 142) and create a derived value from this obtained data. The custom agent 132 can then store this derived value at a node or path defined by a custom YANG model 146 through the OpenConfig agent 122 (e.g., using a gNMI SET referencing the path defined by the custom YANG model 146). This derived value may then be stored at the data structure 156 in memory 154 created based on the custom YANG model 146 and corresponding to this node or path. Moreover, external clients may likewise configure the custom agent 132 on the network device by performing gNMI SETs on certain portion of the custom defined nodes or paths of the schema defined in the custom YANG model 146, where those data structures 156 of the custom defined YANG model 146 maintained in memory 154 by the OpenConfig agent 122 are used by the custom agent 132 for configuration.

External clients can also subscribe to the network element data (e.g., custom nodes, paths or portions of the schema) defined in the custom YANG models 146 through the OpenConfig agent 122. The network element data associated with these custom nodes, paths or portions of schema (e.g., and in some cases set by a custom agent 132 on the network device) can thus get streamed to the subscribing external client by the OpenConfig agent 122 on the network device (e.g., using gNMI). Accordingly, by allowing custom YANG models 146 on the network device, along with custom agents 132 that may determine and set data associated with the nodes, paths or schemas defined by these custom YANG modules 146, embodiments may provide an end to end mechanism where custom network element data may be determined by user defined custom agents 132 on the network device, and this custom network element data associated with a custom node or path and streamed off the network device according to OpenConfig and gNMI using the OpenConfig agent 122 on the network device.

In most cases, when nodes, paths or schemas defined based on vendor supplied YANG models are modified through the OpenConfig agent 122 (e.g., using a gNMI SET), the OpenConfig agent 122 may communicate (either directly through a command line interface or through an intermediary server or agent) with a configuration or other type of agent (e.g. network element agent 128) on the network device to modify corresponding network element data for those nodes, paths or schemas as maintained in the non-volatile system database 126 at the network device. These changes are, at some point, then reflected back to (e.g., picked up) by the in-memory 152 version of those same vendor nodes, paths or schemas maintained by the OpenConfig agent 122.

Figure 2:
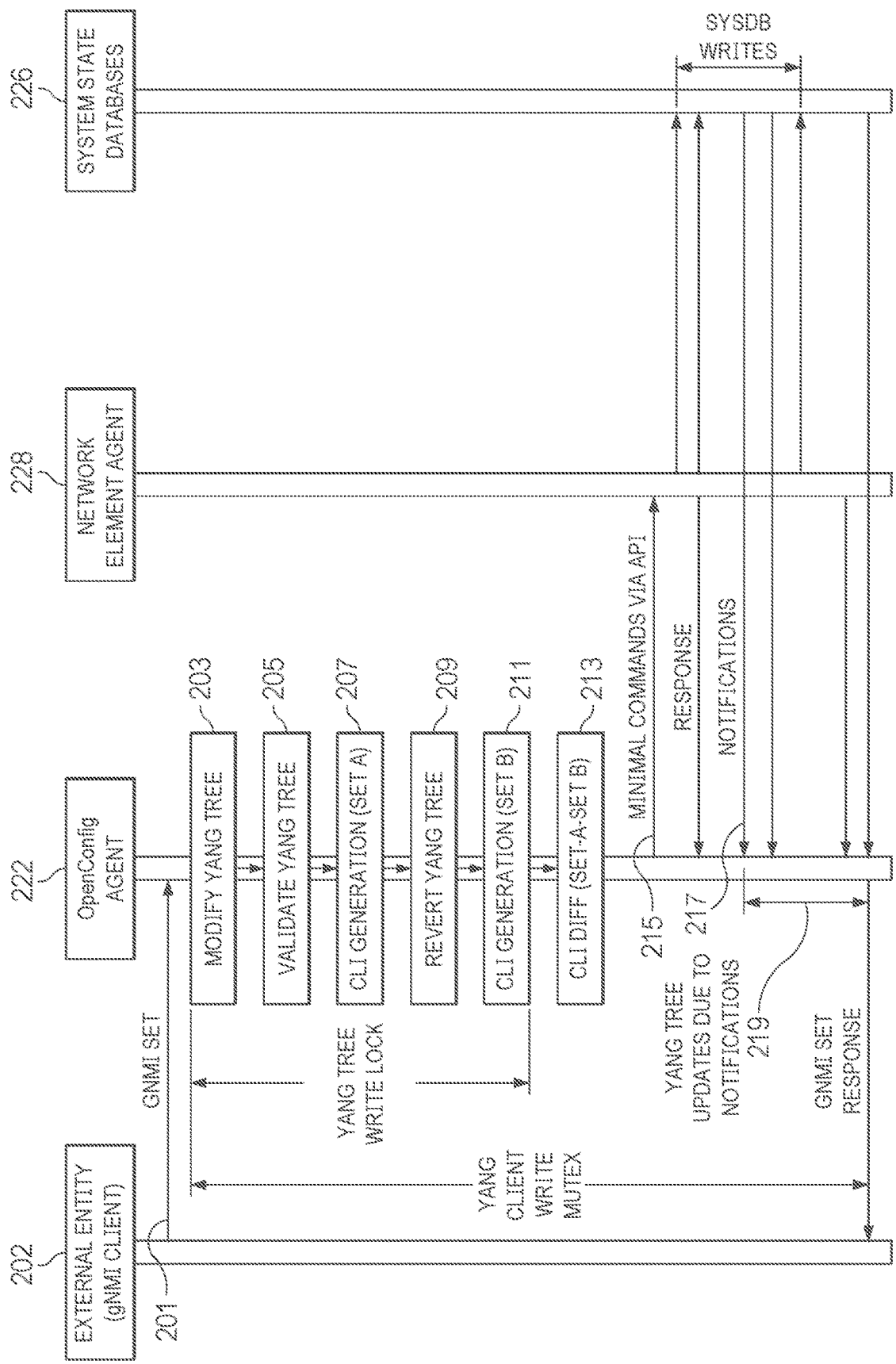
FIG. 2 is a flow diagram of one example of performing a set on data at a network device.

One example of such a scenario is reflected in the flow diagram of FIG. 2. This flow diagram depicts how a gNMI SET may operate for nodes, paths or schemas associated with vendor supplied models where data for those nodes, paths or portions of schema is maintained in the system database as well as in data structures in memory corresponding to the vendor supplied models. Here, upon receiving a SET request 201 from an external entity 202 (e.g., a gNMI client), OpenConfig agent 222 will obtain a transaction lock. Due to this lock, only one SET can be processed or handled at a time. This lock may comprise, for example, a client write mutex that is adapted to allow only one SET to be handled by the OpenConfig agent at a time and a YANG tree write locks such that no other process may modify the in-memory data structures created by the OpenConfig agent to represent the vendor supplied models at the network device.

Once that lock is obtained, the YANG tree reflected in the in-memory data structures (or a portion thereof) may be modified based on the received SET command (STEP 203), the YANG tree validated (STEP 205) and a set of command line interface commands generated based on the state of the in-memory data structure after the modification of the YANG tree of the in-memory data structures (STEP 207). Once this set of commands are generated, the YANG tree (e.g., reflected in the in-memory data structures) may be reverted to the state it was in before the gNMI SET was received (and which was altered to generate the set of command line interface commands) (STEP 209). A set of command line interface commands can then be generated based on the original (reverted) state of the in-memory data structure before the modification of the YANG tree of the in-memory data structures (STEP 211). A difference between the two generated sets of command line interface commands may then be determined to generate a minimal set of commands for reflecting the changed state requested by the received SET in the system database 226 (STEP 213).

This minimal set of commands are then sent to the network element agent 228 (e.g., using an API provided by the network element agent 228) such that alterations to the network elements data of the system databases 226 can be made based on the received SET command (STEP 215). These changes are, at some point, then reflected back to (e.g., picked up) by the YANG tree maintained in the in-memory data structures maintained by the OpenConfig agent 222 such that the in-memory data structures utilized by OpenConfig agent 222 can be updated based on the received SET. For example, notifications 217 specifying the alterations to the network element data in the system database 226 may be obtained by the OpenConfig agent 222, and the YANG tree of the in-memory data structures updated according to such notifications (STEP 219).

Returning to FIG. 1C, for custom nodes, paths or schemas that are derived from custom YANG models 146 where the OpenConfig agent 122 has created in-memory data structures 156 corresponding to those custom nodes, paths or schemas, the behavior described with respect to FIG. 2 may be highly undesirable, as these custom nodes, paths or portions of schema may not exist in the non-volatile system database 126. This is because if the YANG tree of the in-memory data structures 156 is reverted to a previous state after a gNMI SET for one of these nodes, paths or portions of schema, the YANG tree of the in-memory data structures 156 may remain in this reverted state, as there are no corresponding changes in the system database 126 to be reflected back to these in-memory data structure 156 for the custom models 146.

Thus, when a set is performed on a node, path or portion of the schema (e.g., a gNMI SET for a network element is received at the OpenConfig agent 122), the OpenConfig agent 122 may determine that the referenced portion of the schema (e.g., the node, path or portion of the schema referenced by the gNMI GET) is (or is not) associated with the namespace for a custom YANG modules 146 (e.g., the referenced path or schema is in the "custom" namespace). When it is determined that the path or portion of schema whose data is being set by the received gNMI SET command is in that custom namespace, the OpenConfig agent 122 may modify the in-memory data structures 156 corresponding to the node, path or portion of schema being referenced by the received gNMI SET and maintained by the OpenConfig agent 122 without making any calls to the network element agent 128 or the system database 126 (e.g., to attempt to modify non-volatile data associated with that path or portion of schema), as such node or path data doesn't exist in the system database 126. In other words, the OpenConfig agent 122 may not revert the in-memory YANG tree of in-memory data structures 156 corresponding to that custom node, path or portion of schema. Thus, the in-memory data structures 156 are directly modified to reflect a received set for paths or schemas associated with custom module 146.

It will be understood that while specific embodiments have been presented herein, these embodiments are merely illustrative, and not restrictive. Rather, the description is intended to describe illustrative embodiments, features and functions in order to provide an understanding of the embodiments without limiting the disclosure to any particularly described embodiment, feature, or function, including any such embodiment, feature, or function described. While specific embodiments of, and examples for, the embodiments are described herein for illustrative purposes only, various equivalent modifications are possible within the spirit and scope of the disclosure, as those skilled in the relevant art will recognize and appreciate.

As indicated, these modifications may be made in light of the foregoing description of illustrated embodiments and are to be included within the spirit and scope of the disclosure. Thus, while particular embodiments are described, a latitude of modification, various changes and substitutions are intended in the foregoing disclosures, and it will be appreciated that in some instances some features of embodiments of the disclosure will be employed without a corresponding use of other features, and features described with respect to one embodiment may be combined with features of other embodiments without departing from the scope and spirit of the disclosure as set forth.

What is claimed is:

1. A method for network device management, comprising:
   creating, by a network agent on a network device associated with a network management protocol, in-memory data structures representing a vendor supplied data model of the network device, the vendor supplied data model defined in a modeling language;
   storing, at that network device, a user defined custom data model for that network device, wherein the custom data model defines network elements associated with that network device in the modeling language;
   accessing, by the network agent, the custom data model stored at that network device;
   creating, by the network agent at that network device, in-memory data structures representing network elements defined in the custom data model, wherein the in-memory data structures comprise objects in memory of that network device corresponding to network elements defined in the custom data model, the custom data model is associated with a custom namespace, and the created in-memory data structures are associated with the custom namespace;
   receiving, at the network agent at that network device, a request according to the network management protocol, wherein the received request specifies a network element associated with that network device;
   determining, at that network device, that the specified network element is associated with the custom data model for that network device, including determining the specified network element is associated with the custom namespace; and
   implementing, by the network agent at that network device, the received request on the network device, wherein implementing the received request at the network device comprises accessing the in-memory data structures representing the custom data model to obtain or set network element data associated with the specified network element in the in-memory data structures associated with that network element of the custom data model such that the specified network element associated with the custom data model is configured on that network device according to the received request.

2. The method of claim 1, wherein the request is received from a custom agent on the network device.

3. The method of claim 1, wherein the vendor supplied data model is a vendor neutral data model.

4. The method of claim 3, wherein the vendor neutral data model is OpenConfig.

5. The method of claim 4, wherein the network management protocol is gNMI.

6. The method of claim 5, wherein the modeling language is Yet Another Next Generation (YANG).

7. The method of claim 1, wherein the custom data model is stored after the network device is booted.

8. A network device, comprising:
   a processor;
   a system database;
   a memory; and
   a non-transitory computer readable medium, comprising instructions for:
     creating data structures representing a vendor supplied data model in the memory of that network device, wherein the vendor supplied data model is defined in a modeling language;
     accessing a user defined custom data model for that network device stored at the network device, wherein the custom data model defines network elements associated with that network device in the modeling language;
   creating, in the memory at the network device, data structures representing network elements of the custom data model stored at the network device, wherein the data structures representing network elements of the custom data model comprise objects in memory of that network device corresponding to network elements defined in the custom data model, the custom data model is associated with a custom namespace, and the data structures representing the network elements of the custom model in the memory are associated with the custom namespace;
   receiving, at the network device, a request according to a network management protocol, wherein the received request specifies a network element associated with that network device;
   determining at the network device, the specified network element is associated with the custom data model, including determining the specified network element is in the custom namespace; and
   implementing the received request on the network device, wherein implementing the received request comprises accessing the data structures in memory representing the custom data model in response to the determination the network element is in the custom namespace to directly modify the data structures in memory associated with the specified network element of the custom data model to obtain or set network element data associated with the specified network element in the data structures in memory associated with the specified network element of the custom data model such that the specified network element associated with the custom data model is configured on that network device according to the received request.

9. The network device of claim 8, wherein the request is received from an agent executing the network device.

10. The network device of claim 9, wherein the request is to set network element data and includes a value.

11. The network device of claim 10, wherein the value is a derived value determined by the agent from network element data stored in the system database.

12. The network device of claim 8, wherein the memory is a volatile memory.

13. The network device of claim 8, wherein the vendor supplied data model is a vendor neutral data model.

\* \* \* \* \*